United States Patent [19]

Zinn et al.

[11] 4,349,070
[45] Sep. 14, 1982

[54] TUBE MAT HEAT EXCHANGER

[76] Inventors: Michael F. Zinn; Steven E. Krulick; Ronald W. Leonard, all of P.O. Box 87, 221 Canal St., Ellenville, N.Y. 12428

[21] Appl. No.: 178,885

[22] Filed: Aug. 18, 1980

Related U.S. Application Data

[62] Division of Ser. No. 17,728, Mar. 5, 1979, Pat. No. 4,270,596.

[51] Int. Cl.³ .................................................. F28F 9/02
[52] U.S. Cl. .................................. 165/173; 285/214; 285/260
[58] Field of Search ................ 29/523; 285/162, 188, 285/189, 213, 214, 215, 222, 260; 138/118, 120; 165/1, 171, 173, 76, 175

[56] References Cited

U.S. PATENT DOCUMENTS

| | | | |
|---|---|---|---|
| 1,102,163 | 6/1914 | Opperud | 285/214 |
| 1,668,978 | 5/1928 | Rhinevault | 285/213 |
| 3,114,969 | 12/1963 | Roth | 285/162 |
| 3,989,282 | 11/1976 | Zimmerman | 285/222 |
| 4,060,070 | 11/1977 | Harter | 165/171 |

*Primary Examiner*—Albert W. Davis
*Assistant Examiner*—Margaret A. Focarino
*Attorney, Agent, or Firm*—Charles J. Brown

[57] ABSTRACT

A heat exchanger adapted particularly for use in embedded radiant heating systems wherein the tube ends are joined to the manifolds by the use of tube-stretching inserts.

4 Claims, 7 Drawing Figures

TUBE MAT HEAT EXCHANGER

CROSS-REFERENCE TO RELATED APPLICATION

This application is a division of our copending application Ser. No. 17,728 filed Mar. 5, 1979 and entitled "Tube Mat Heat Exchanger", now U.S. Pat. No. 4,270,596.

BACKGROUND OF THE INVENTION

Prior art radiant heating systems typically employ copper pipe embedded within a concrete slab, or beneath a slab in sand for additional thermal mass. Heated water is circulated through the pipes to transfer thermal energy to the concrete or sand and heat the space above the slab by radiation. Significant disadvantages in systems of this type have been recognized and it is the purpose of the present invention to provide an improved heat exchanger design which overcomes those disadvantages.

Heat transfer systems using copper pipe are subject to corrosion particularly by alkali in the concrete, and thermal expansion and contraction of the pipes and shifting or cracking of the concrete imposes stresses which can cause leaks in the pipe virtually impossible to repair. Concrete has a low rate of heat transfer in comparison to copper and for that reason the use of low temperature water with copper pipe is not economically practical. Copper pipe is quite expensive and the cost of such systems becomes prohibitive unless relatively higher water temperatures are employed.

Perhaps the closest prior art to the tube-stretching inserts of the present invention is Roth U.S. Pat. No. 3,114,969 or Rhinevault U.S. Pat. No. 1,668,978, but neither anticipates the features of the connecting means claimed here. The tube mat per se described below is the subject of U.S. Pat. No. 4,176,654.

SUMMARY OF THE INVENTION

The invention provides a heat exchanger wherein at least one fluid-conducting tube of elastomeric material has a certain inside and outside diameter and communicates with the interior of a hollow manifold through a cylindrical hole in the wall thereof. Connecting means join the tube to the manifold and comprise a rigid cylindrical insert having an outside diameter at least as great as the inside diameter of the tube and an axial length greater than the axial length of the cylindrical hole in the manifold wall. The insert is fitted within an end portion of the tube. The hole in the manifold wall has a diameter greater than the insert outside diameter and less than the tube diameter around the insert. The tube end portion is located and compressed within the hole with the respective ends of the insert extending inwardly and outwardly of the manifold wall.

The invention further provides a method of connecting each tube within a cylindrical hole in the manifold wall. First, a cylindrical insert is located within an end portion of the tube, the insert having an outside diameter at least as great as the inside diameter of the tube and an axial length greater than the axial length of the cylindrical hole, the hole itself having a diameter greater than the insert outside diameter and less than the tube diameter around the insert. The tube end portion is then forced within the hole with the respective ends of the insert extending inwardly and outwardly of the manifold wall so that the wall of the tube end portion is compressed within and seals the hole.

Among the advantages of the present tube mat heat exchanger system over copper pipe systems of the prior art are the following: The tube mat has a continuous multi-tube profile which is easily covered with thin slabs of concrete. In the event of failure of any one tube it can be clamped off adjacent the manifolds and isolated so that the remainder of the system continues to function properly. Similarly, selected tubes may be clamped off to isolate zones from the heat exchange fluid and thus make it possible to correct areas of overheating. Thermal expansion and contraction of the mat is virtually zero and since it is of elastomeric material freezing cannot cause ruptures. For the same reason, shifting or cracking of the floor does not necessarily damage the tube mat. The system is low in initial cost and is particularly advantageous for efficient low-temperature heat transfer.

Other advantages and observations of the invention will become apparent from the following description taken in conjunction with the accompanying drawings.

DESCRIPTION OF PREFERRED EMBODIMENT

Figure 1:
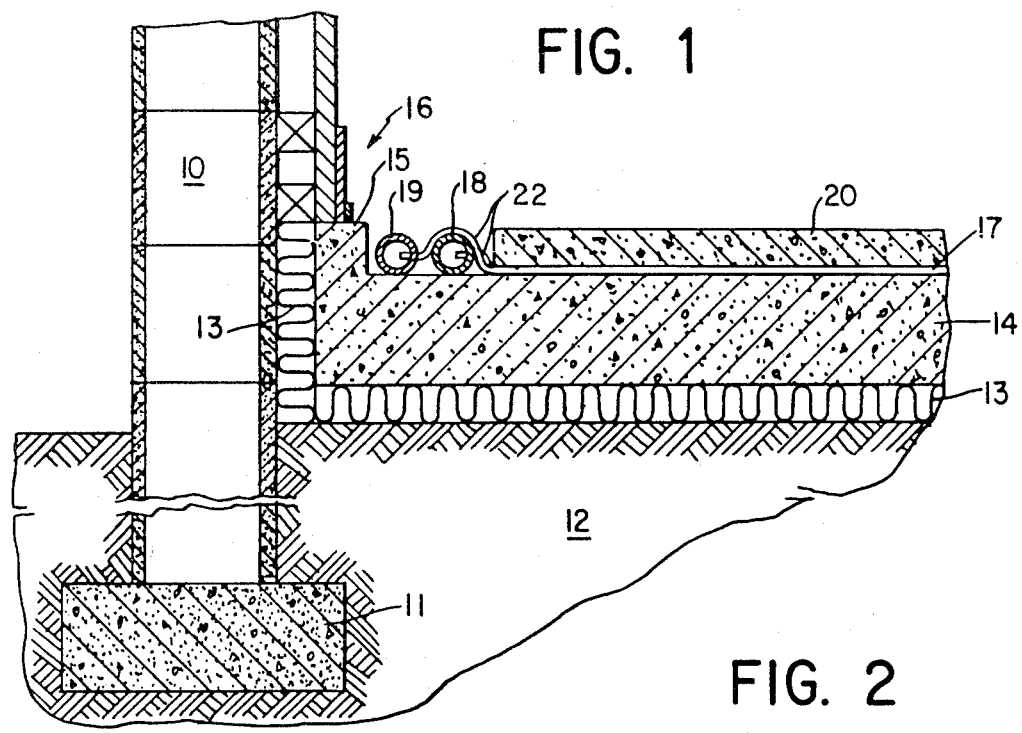
FIG. 1 is a vertical section partly broken away of a typical slab concrete floor employing the tube mat heat exchanger of the invention.

Referring first to FIG. 1, a typical wall and foundation construction 10 with footings 11 is shown on substrata 12. Underlying insulation 13 is first applied, usually with vapor barriers, either beneath or above the insulation or both. An underlying concrete slab 14 is applied over the insulation within the wall construction 10 and it may include an upstanding peripheral portion 15 supporting typical wall construction components 16. In accordance with the invention, tube mat heat exchangers 17 are disposed over the underlying concrete slab 14 and communicate with at least one pair of first and second manifolds 18 and 19. The manifolds may be located in a trough alongside the peripheral portion 15 of the concrete slab 14 and may be exposed for purposes of connection and subsequent maintenance. A poured concrete floor slab 20 is applied as a matrix over the tube mat heat exchangers 17 so that they are embedded therewithin.

It is understood that certain aspects of the construction described above are only illustrative and may well vary depending upon the particular installation. For example, the tube mat heat exchangers 17 could be applied directly to a sand flooring with the concrete slab 20 applied over them.

Figure 3:
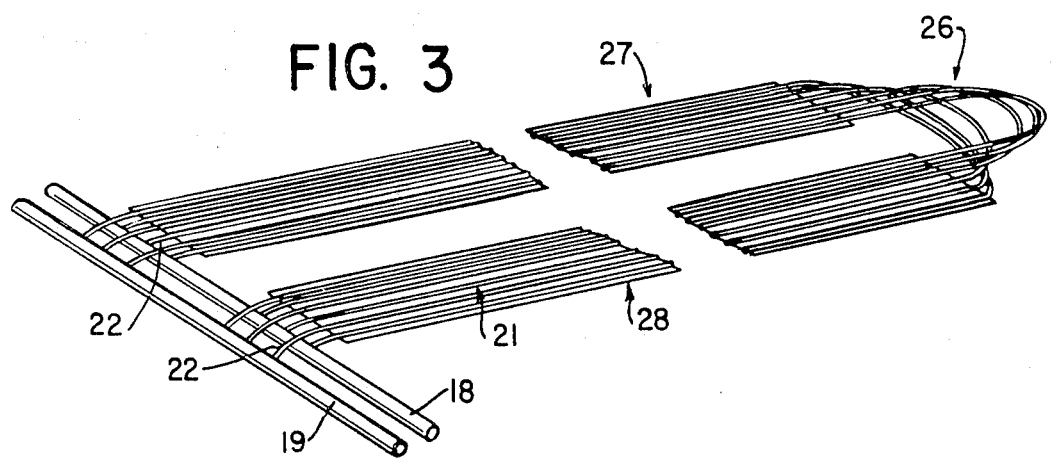
FIG. 3 is a fragmentary perspective view partly broken away showing the tube mats and manifolds of the invention.
Figure 4:
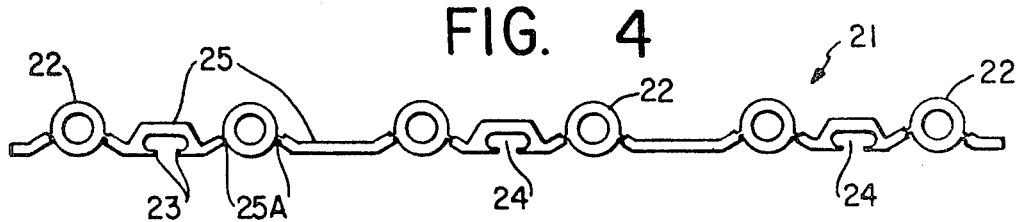
FIG. 4 is a transverse section through one of the tube mats.

In FIGS. 3 and 4, the tube mat construction is shown. A preferred form is described and claimed in detail in the previously mentioned copending application filed July 18, 1977 and entitled Solar Heating Apparatus. Such mats are formed from an integral extrusion of elastomeric material such as synthetic rubber and particularly EPDM (ethylene propylene diene monomer or terpolymer). A given tube mat (see FIGS. 3 and 4) 21 has a plurality of tubes 22 which are equally spaced parallel to one another. Each tube may have a nominal outside diameter of 0.338 in. and a nominal inside diameter of 0.203 in. so that its wall thickness is 0.067 in. As described in the aforementioned copending application the underside of the tube mat may have a plurality of deflectable projections 23 which define a plurality of inwardly diverging recesses 24. In the example shown, there are six of the tubes 22 and three of the recesses 24. Each adjoining pair of tubes is connected by a web 25 which is easily severed lengthwise along tear lines 25A to permit the tubes to be separated.

In radiant heating systems of the prior art employing embedded copper pipe, some form of hold-down devices are typically employed to hold the pipe to the underlying floor. The pipe is usually arranged in a sinusoidal configuration and such devices serve to fix the pipe in place as the concrete slab is poured. One advantage of using the tube mat described above is that the mat may be held in place during the pouring of the concrete by a layer of mastic over the underlying floor which penetrates the recesses 24 to hold the mat in releasable fashion. This gripping action is mechanical in nature and does not depend upon a chemical bond between the mastic and the elastomeric material of the mat. However, it is to be understood that the invention is equally applicable to tube mats with smooth undersurfaces where other means are relied upon for holding them in place.

Figure 6:
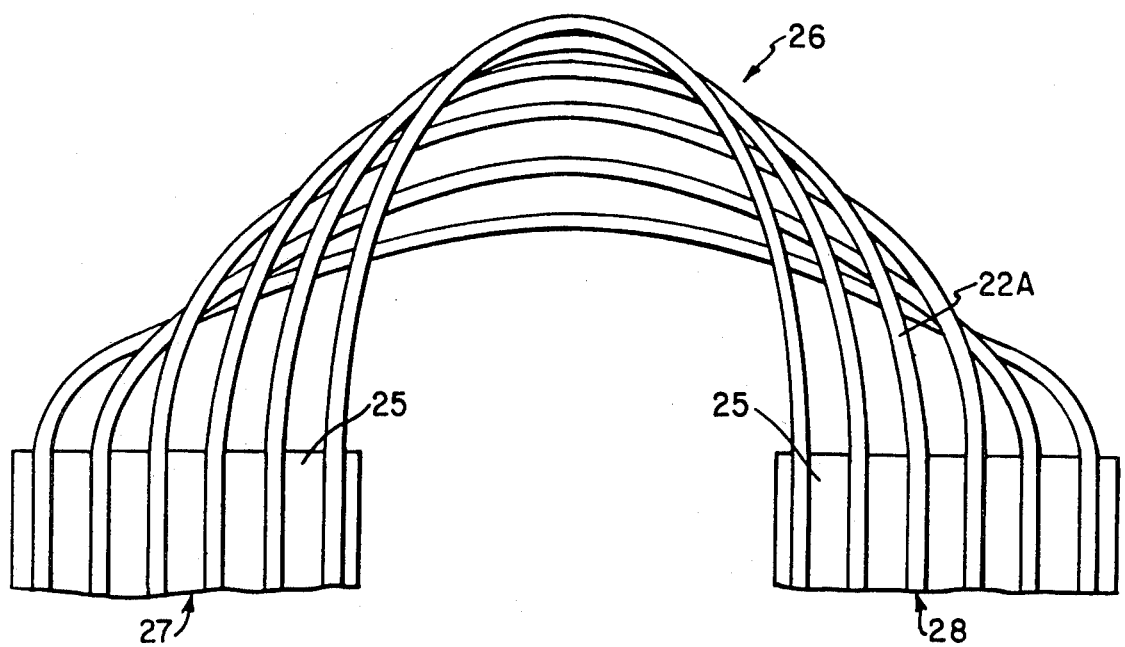
FIG. 6 is a fragmentary plan view of the central section of one of the mats connecting the aligned subsections.

In preparing a given tube mat for installation it is unrolled from an extended length and cut to the desired individual length. The webs 25 between the tubes 22 are removed in a central mat section 26. As shown in FIGS. 3 and 6, resulting subsections 27 and 28 of the mat 21 to each side of the central section 26 are aligned parallel and side-by-side substantially coplanar with the free tubes 22A in the central section 26. By this construction the subsections 27 and 28 are connected to one another through uninterrupted and integral intermediate sections of the various tubes 22 and a low profile is maintained to ensure that the entire mat is readily covered by the concrete floor 20.

Figure 5:
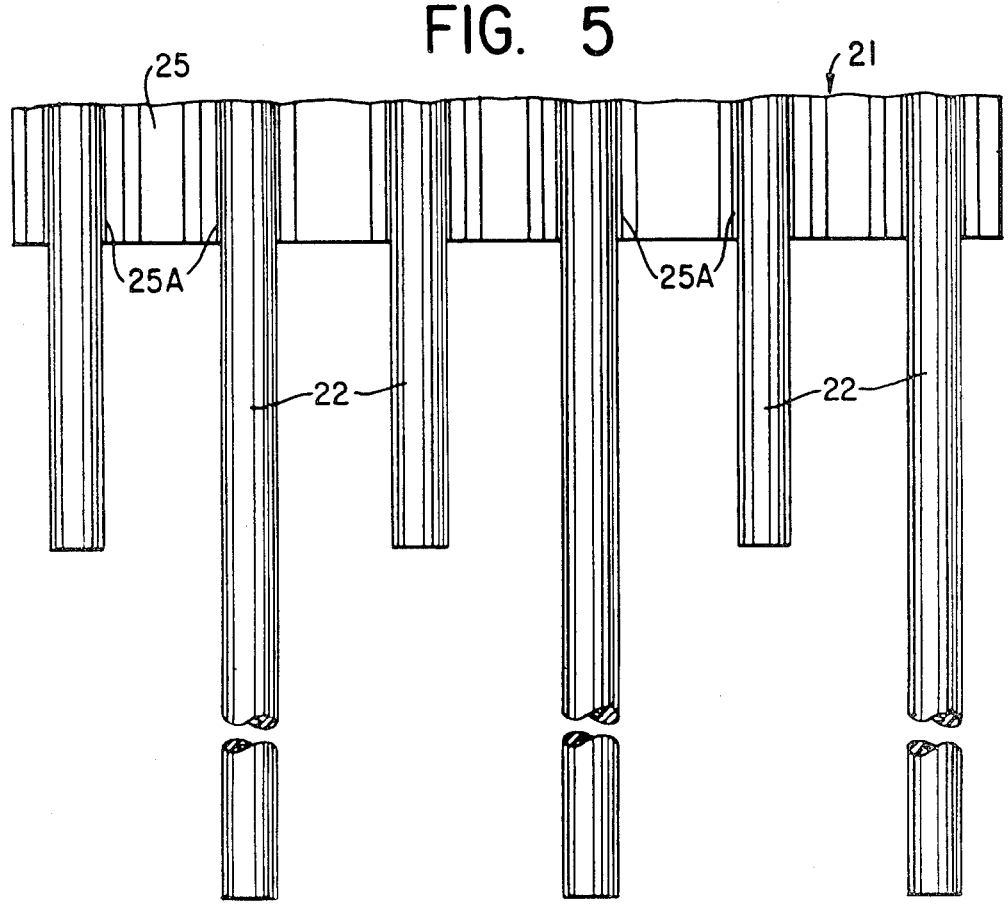
FIG. 5 is a fragmentary plan view of one of the ends of the tube mat adapted for connection to the manifold.

As shown in FIGS. 3 and 5, the tubes 22 are torn free of their webs 25 along the tear lines 25A at the end portions of the mat remote from the central section 26. One end of each of the tubes 22 where it is free of the web is cut relatively long and the other end is cut relatively short for appropriate connection to the respective pair of manifolds 18 and 19. It is apparent, particularly from FIG. 3, that each tube constitutes a loop between the two manifolds and the low-temperature water flowing from one manifold to the other passes through the full length of the mat.

Figure 7:
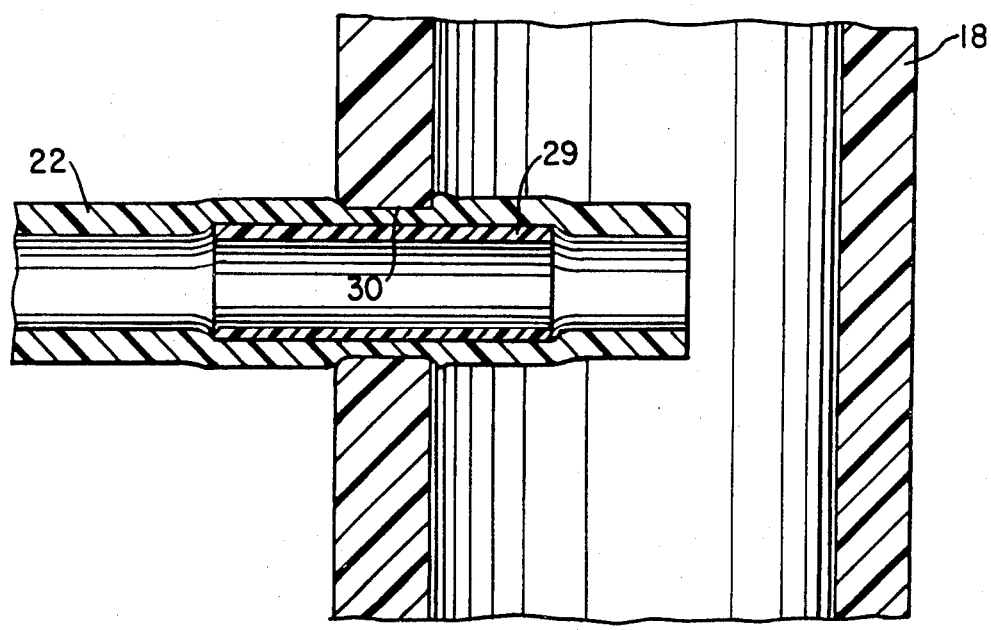
FIG. 7 is an enlarged fragmentary longitudinal section of the connection between one of the tube ends and one of the manifolds.

Referring now to FIG. 7, a given tube 22 is shown in connection with the first manifold 18 through a circular hole in the wall of the manifold. Each tube of the system communicates through such respective holes in the manifold wall at both of the tube ends. The manifolds 18 and 19 may be either of copper or plastic, their inside diameter being approximately one inch if copper and slightly larger if plastic. Their wall thickness may range from 0.150 in. to 0.200 in.

In accordance with the invention, a cylindrical plastic insert 29 is employed, preferably of polytetrafluoroethylene, which is typically three-quarters of an inch long, longer than the manifold wall thickness, and may have an outside diameter of 0.250 in. and an inside diameter of 0.187 in. The insert is pushed into the end of the tube 22 to the position shown in FIG. 7 approximately one-eighth of an inch inside the tube end. It may stretch the tube to an outside diameter greater than elsewhere along the tube.

The respective circular hole 30 in the wall of the manifold 18 has a fixed minimum diameter, for example 0.312 in., which is less than the tube diameter around the insert but greater than the insert outside diameter. The hole is cylindrical and is shown for purposes of illustration as being of constant diameter from the inside to the outside manifold wall surfaces. In practice, however, for a plastic manifold the hole is drilled and chamfered and for a copper manifold it is drilled and punched and, in either case, the cylindrical section of the hole may comprise only part of the manifold wall thickness. The stretched tube end portion is forcibly inserted into the cylindrical hole and is thereby compressed within the hole with the respective ends of the insert extending inwardly and outwardly of the manifold wall. The tube wall around the insert bulges outwardly as shown and seals the periphery of the hole to ensure that the end of the tube is firmly, but releasably, held in place. With only one additional component, the tube is attached to the manifold without having access to the interior of the manifold.

Figure 2:
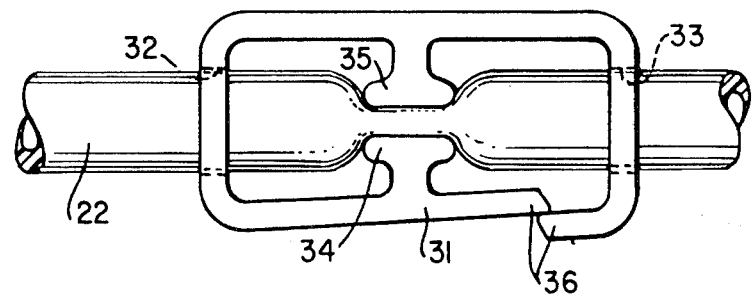
FIG. 2 is a fragmentary view of a clamp for isolating one or more of the tubes.

In FIG. 2 a form of clamp 31 is shown by which one of the tubes 22 may be pinched off to prevent fluid flow. The clamp has aligned holes 32 and 33 through which the end portion of the tube 22 is inserted. Opposed squeezing portions 34 and 35 compress the tube to close it off when end members 36 of the clamp are brought together. Temperature zone control may be achieved with such clamps to correct overheating in certain areas. Also, individual tubes can be clamped off to isolate damage while the operation of the remainder of the system continues unaffected.

The tube mat heat exchangers of the invention provide particularly uniform floor temperatures because they use reverse-directional flow in alternate tubes to accomplish temperature averaging. The tube mats are inert to chemical attack and since they are elastic they readily withstand expansion and contraction due to freezing or shifting of the concrete floor.

The scope of the present invention is set forth in the following claims rather than in the foregoing description of a preferred embodiment.

We claim:
1. In a heat exchanger wherein at least one fluid-conducting tube of elastomeric material having a certain inside and outside diameter communicates with the interior of a hollow manifold through a cylindrical hole in the wall thereof, connecting means joining the tube to the manifold comprising:
 (a) a rigid cylindrical insert having an outside diameter at least as great as the inside diameter of the tube and an axial length greater than the axial length of the cylindrical hole in the manifold wall and pre-fitted within an end portion of the tube;

(b) the hole in the manifold wall having a diameter greater than the insert outside diameter and less than the tube diameter around said insert; and (c) the tube end portion around the insert being located and compressed within said hole entirely from the exterior of the hollow manifold with the respective ends of the insert extending inwardly and outwardly of the manifold wall.

2. A heat exchanger according to claim 1 wherein the insert stretches the tube end portion to an outside diameter greater than elsewhere along said tube.

3. A method of connecting a tube of elastomeric material having a certain inside and outside diameter with the interior of a manifold through a cylindrical hole in the wall thereof comprising:

(a) pre-fitting within an end portion of the tube a cylindrical insert having an outside diameter at least as great as the inside diameter of the tube and an axial length greater than the axial length of the cylindrical hole, said hole having a diameter greater than the insert outside diameter and less than the tube diameter around the insert; and (b) forcing the tube end portion within the hole entirely from the exterior of the hollow manifold with the respective ends of the insert extending inwardly and outwardly of the manifold wall so that the wall of the tube end portion is compressed within and seals the hole.

4. A method according to claim 3 wherein the insert outside diameter is greater than the inside diameter of the tube and the tube is thereby stretched when the insert is inserted within the end portion of the tube.

* * * * *

REEXAMINATION CERTIFICATE (168th)
United States Patent [19]
Zinn et al.

[11] B1 4,349,070
[45] Certificate Issued Feb. 21, 1984

[54] TUBE MAT HEAT EXCHANGER

[75] Inventors: Michael F. Zinn; Steven E. Krulick; Ronald W. Leonard, all of Ellenville, N.Y.

[73] Assignee: Bio-Energy Systems, Inc., Ellenville, N.Y.

Reexamination Request:
No. 90/000,397, Jun. 6, 1983

Reexamination Certificate for:
Patent No.: 4,349,070
Issued: Sep. 14, 1982
Appl. No.: 178,885
Filed: Aug. 18, 1980

Related U.S. Application Data

[62] Division of Ser. No. 17,728, Mar. 5, 1979, Pat. No. 4,270,596.

[51] Int. Cl.³ ............................................. F28F 9/02
[52] U.S. Cl. .................................. 165/173; 285/214; 285/260; 285/158; 285/162
[58] Field of Search ................ 29/523; 165/171, 173, 165/76, 175; 138/118, 120; 285/162, 188, 189, 213, 214, 215, 222, 260, 158

[56] References Cited
U.S. PATENT DOCUMENTS

| | | | |
|---|---|---|---|
| 1,102,163 | 6/1914 | Opperud | 285/214 |
| 1,668,978 | 5/1928 | Rhinevault | 285/213 |
| 3,114,969 | 12/1963 | Roth | 285/162 |
| 3,222,093 | 12/1965 | Simmons | 285/162 |
| 3,648,768 | 3/1972 | Scholl | 165/171 |
| 3,989,282 | 11/1976 | Zimmerman | 285/162 |
| 4,054,980 | 10/1977 | Roma | 165/172 |
| 4,060,070 | 11/1977 | Harter | 165/171 |

*Primary Examiner*—A. W. Davis, Jr.

[57] ABSTRACT

A heat exchanger adapted particularly for use in embedded radiant heating systems wherein the tube ends are joined to the manifolds by the use of tube-stretching inserts.

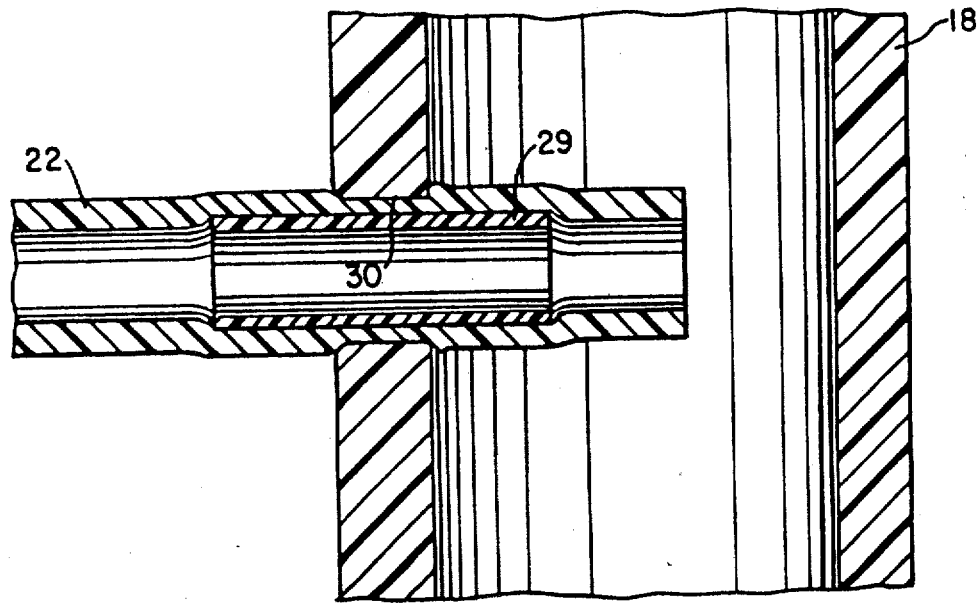

REEXAMINATION CERTIFICATE ISSUED UNDER 35 U.S.C. 307.

NO AMENDMENTS HAVE BEEN MADE TO THE PATENT.

AS A RESULT OF REEXAMINATION, IT HAS BEEN DETERMINED THAT:

The patentability of claims 1-4 is confirmed.

* * * * *